United States Patent [19]

Nakada et al.

[11] Patent Number: 5,793,329
[45] Date of Patent: Aug. 11, 1998

[54] OBJECT DETECTION APPARATUS

[75] Inventors: Kenji Nakada; Makoto Yagi, both of Urawa, Japan

[73] Assignee: The Nippon Signal Co., Ltd., Tokyo, Japan

[21] Appl. No.: 793,800

[22] PCT Filed: Jul. 2, 1996

[86] PCT No.: PCT/JP96/01827

§ 371 Date: Mar. 17, 1997

§ 102(e) Date: Mar. 17, 1997

[87] PCT Pub. No.: WO97/04337

PCT Pub. Date: Feb. 6, 1997

[30] Foreign Application Priority Data

Jul. 17, 1995 [JP] Japan .................. 7-179776

[51] Int. Cl.$^6$ .......................... H04B 7/185; G01S 5/02
[52] U.S. Cl. ................................................ 342/357
[58] Field of Search .................. 342/357; 364/449.7; 343/719

[56] References Cited

U.S. PATENT DOCUMENTS 5,610,616  3/1997  Vallot et al. ................... 342/357

*Primary Examiner*—Theodore M. Blum
*Attorney, Agent, or Firm*—Oblon, Spivak, McClelland, Maier & Neustadt, P.C.

[57] ABSTRACT

The presence/absence of an object, movement of the object, the direction of movement, the speed of movement, the shape of the object, the quantity of objects and time information related to these factors are detected without installing a means for transmission. An antenna device (1) has a function of receiving radio waves (EW1 to EW24) transmitted by GPS satellites and outputs a detection signal when the reception of the radio waves (EW1 to EW24) transmitted by the GPS satellites is blocked by an object (A). A signal processing device (2) detects the object (A) based upon the detection signal provided by the antenna device (1).

17 Claims, 14 Drawing Sheets

OBJECT DETECTION APPARATUS

TECHNICAL FIELD

The present invention relates to an apparatus that detects an object located on the ground.

BACKGROUND ART

Various detection apparatuses have been disclosed and put into practical use in the prior art to be employed as means for detecting different types of vehicles and aircraft on the ground. Normally, an electric means for detection, a magnetic means for detection, an optical means for detection, an ultrasonic means for detection or the like is positioned in a traveling path where a vehicle or aircraft travels so that the vehicle or aircraft can be detected within the detection range that is covered by the means for detection. Such a means for detection is constituted with a transmission device and a reception device and, under normal circumstances, a signal indicating that a vehicle or aircraft has been detected is generated when a signal wave transmitted by the transmission device is influenced by the vehicle, changing the reception signal at the reception device to an extent that exceeds a predetermined threshold value. For instance, Japanese Unexamined Patent Publication (KOKAI) No. 138816/1990 discloses a technology through which the position of an aircraft on the ground in a taxiway is detected by providing a transmission coil and a reception coil in the taxiway so that the aircraft can be detected through a change in the electric coupling of the two coils caused by the aircraft. In addition, Japanese Unexamined Patent Publication (KOKAI) No. 217100/1993 discloses a technology for detecting aircraft based upon a received waveform when a microwave transmitted by a transmitter and received by a receiver becomes influenced by the aircraft.

One of the problems of the prior art technologies described above is that, since a transmission device is required as an essential component to be used in combination with a reception device, installation work is required to install the transmission device in the traveling path of the vehicles or in the vicinity thereof.

Another problem is that, when the transmission device is installed on the ground, the transmission device will constitute a projecting ground surface obstacle, which may present a hindrance to the traffic of vehicles or to traffic control.

DISCLOSURE OF THE INVENTION

It is an object of the present invention to provide a new object detection apparatus that does not require a means for transmission.

It is a further object of the present invention to provide an object detection apparatus that is capable of detecting the presence/absence of an object, the movement of an object, the direction of movement, the speed of movement, the shape of an object and the quantity of objects as well as time information in regard to them.

It is a still further object of the present invention to provide an object detection apparatus that can be installed easily.

It is a still further object of the present invention to provide an object detection apparatus that can be constituted as an underground, embedded type detection apparatus without having projecting ground surface obstacles.

In order to achieve the objects described above, the object detection apparatus according to the present invention has a function through which an radio wave transmitted from a GPS satellite is received. The apparatus detects an object when the reception of the radio wave transmitted by the GPS satellite is blocked by the object.

A GPS satellite refers to an artificial satellite employed as part of the Global Positioning System. In the present invention, GPS satellites that were launched for the purpose of measuring and positioning are utilized for object detection. Since there are three or more GPS satellites accessible from anywhere on the earth at all times, it is possible to receive radio waves transmitted from one or more GPS satellites at all times.

With this, a new object detection apparatus that does not require the installation of a means for transmission for detecting the presence of an object on the ground is achieved.

In addition to detecting the presence of an object, the apparatus is capable of detecting the duration over which the object is present, the speed at which it moves, the direction of its movement, its shape, including the length, width or the like, as well as the quantity of objects and the like. Furthermore, the present invention may be adopted in detection of either a stationary object or a moving object.

Moreover, it should be noted that a GPS satellite is internally provided with an extremely accurate atomic clock and transmits a very precise time signal to the earth based upon this atomic clock. The object detection apparatus according to the present invention receives this time signal as well. As a result, it is capable of detecting time information related to the presence of an object, the movement of the object, the direction of the movement, the speed of the movement, the shape, the quantity or the like. It is also possible to create time information at a signal processing device.

In the object detection apparatus according to the present invention, a GPS satellite is used as a transmission device which functions in combination with the object detection apparatus, and the object detection apparatus according to the present invention requires only that a reception device, i.e., an antenna device, for instance, for receiving radio waves transmitted by the GPS satellite be installed in the object detection range or in its vicinity. Thus, an object detection apparatus that can be easily installed is achieved. Only the minimum portion that is required for reception of the antenna device that receives radio waves transmitted by the GPS satellite needs to be exposed at the ground surface and the rest of the antenna device can be embedded in the ground. Consequently, the object detection apparatus can be achieved as an underground, embedded type apparatus, which does not have projecting ground surface obstacles.

One of the most likely areas in which the present invention may be applied is in the detection of various types of vehicles and aircraft on the ground.

Other objects, structural features and advantages of the present invention are explained in further detail by referring to the drawings which are attached in order to show preferred embodiments.

BEST MODE FOR CARRYING OUT THE INVENTION

Figure 1:
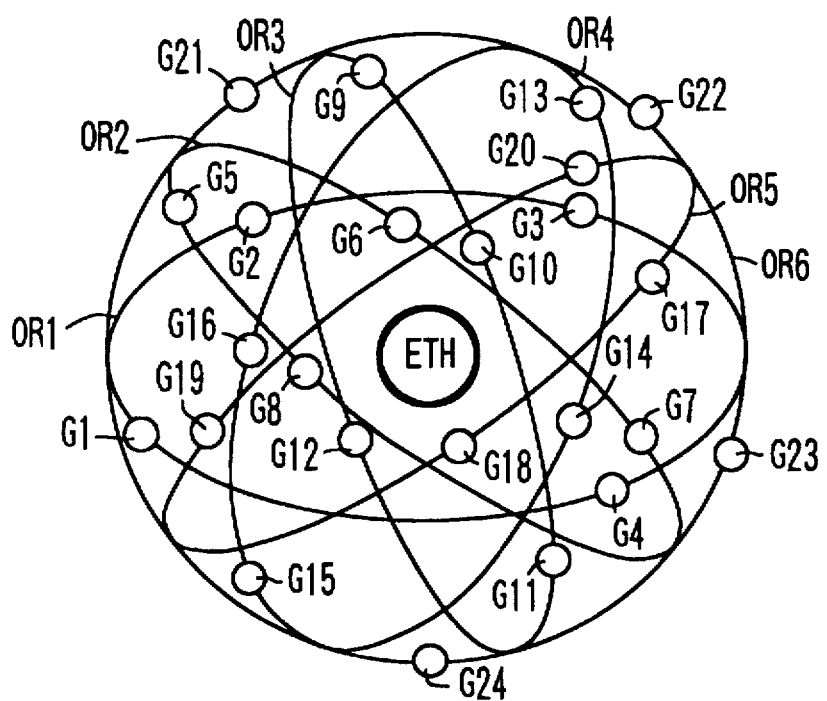
FIG. 1 shows the positioning of GPS satellites employed in the Global Positioning System.

In FIG. 1, which illustrates the positions of the GPS satellites employed in the Global Positioning System, a total of 24 GPS satellites G1 to G24 are positioned, four in each six orbits OR1 to OR6 which are approximately 20000 kilometers above the earth. Thus, there are three or more GPS satellites G1 to G24 accessible at all times anywhere on the earth ETH. Under normal circumstances, in the Global Positioning System, satellite measuring and positioning is executed by using these GPS satellites G1 to G24.

Figure 2:
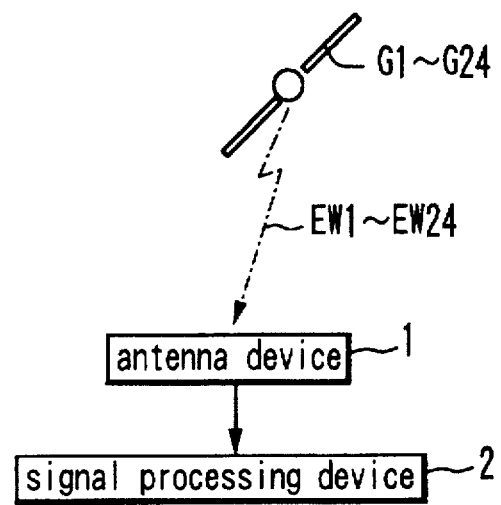
FIGS. 2a and 2b show an object detection apparatus that detects the presence/absence of an object.
Figure 2:
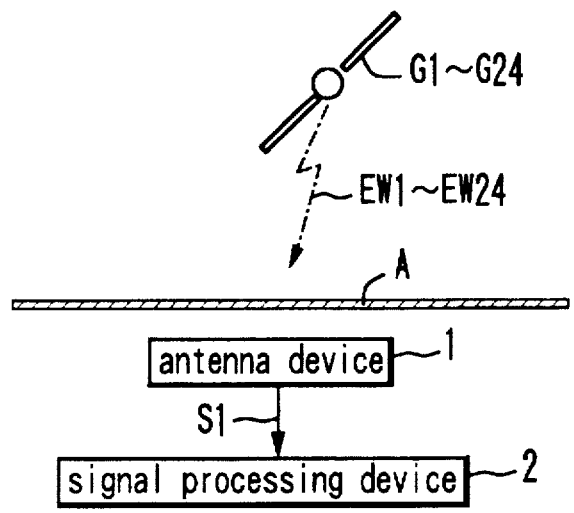

In the present invention, the GPS satellites G1 to G24 which were launched for measuring and positioning, are utilized for detection of objects on the ground instead of measuring and positioning. In FIG. 2, an example of such an object detection apparatus that detects the presence/absence of an object A at a specific location is shown. A specific example of application of this object detection apparatus is a parked car detection apparatus, which detects the presence/absence of a parked vehicle in a parking lot.

In FIG. 2, the object detection apparatus includes at least one antenna device 1. The antenna device 1 is provided with a function of receiving radio waves EW1 to EW24 transmitted from the GPS satellites G1 to G24. As explained earlier, since there are three or more GPS satellites G1 to G24 accessible at all times from anywhere on the earth, the antenna device 1 is capable of receiving at least one of the radio waves EW1 to EW24 transmitted from GPS satellites G1 to G24 (see FIG. 2 (a)). The antenna device 1 may include a reception antenna and a reception circuit.

The antenna device 1 outputs a detection signal S1 when the reception of the radio waves EW1 to EW24 transmitted from the GPS satellites G1 to G24 is blocked by the object A (see FIG. 2 (b)). In the state illustrated in FIG. 2 (a), the antenna device 1 is receiving the radio waves EW1 to EW24 transmitted from the GPS satellites G1 to G24 and outputs a high level signal. However, in the blocked state shown in FIG. 2 (b), the detection signal S1 transmitted by the antenna device 1 is set to low.

A signal processing device 2 processes the low level detection signal S1 provided by the antenna device 1. This makes it possible to judge that the object A is present.

With the object detection apparatus according to the present invention, since the GPS satellites G1 to G24 are employed as transmission devices to be used in combination with the antenna device 1, it is only necessary to install the antenna device 1 for receiving the radio waves EW1 to EW24 transmitted from the GPS satellites G1 to G24 in an area in which the object A may encroach or in its vicinity. Thus, an object detection apparatus that is easy to install is achieved.

The antenna device 1, which receives the radio waves EW1 to EW24 transmitted from the GPS satellites G1 to G24, may be installed in such a manner that the minimum portion required for reception, i.e., a reception antenna, for instance, is exposed at the ground surface with the remaining portion embedded underground. As a result, the antenna device 1 can be achieved as an underground, embedded type which does not have a projecting ground surface obstacle.

The GPS satellites G1 to G24 are each internally provided with an extremely accurate atomic clock. Each transmits a precise time signal to the earth based upon the atomic clock and the antenna device 1 and the signal processing device 2 receive these time signals. Consequently, in the embodiment shown in FIG. 2, in addition to the presence/absence of the object A, time information can be obtained in regard to the presence of the object A. The time information may be prepared at the signal processing device 2.

In addition, the GPS satellites G1 to G24 transmit orbit information which is referred to as navigation messages in addition to the time signals explained above. More specifically, navigation messages are transmitted in data strings over 30 seconds of transmission time, including the orbit information, the correction value of the clock and the like related to the satellite. The volume of data in the frame of the data string mentioned above contains information that amounts to 1900 bits and one master frame is constituted of 25 such frames. This master frame contains the orbit information in regard to all the satellites. The orbit information on all the satellites contained in the master frame is referred to as the almanac and based upon this information, the position of any given satellite above the point of reception on the ground can be ascertained.

In practice, the signal processing device 2 is constituted of a computer system and is provided at a position distanced from the antenna device 1. GPS reception technology and signal processing technology that are employed in combination with the GPS satellites in the GPS measuring and positioning technology are disclosed in Japanese Unexamined Patent Publication (KOKAI) No. 191880/1988 and Japanese Unexamined Patent Publication (KOKAI) No. 156395/1991. The signal processing device 2 employed in the present invention may be easily achieved by adopting the technologies disclosed in these prior art publications.

One preferred mode of the present invention utilizes the orbit information transmitted by the GPS satellites G1 to G24. The signal processing device 2 decodes the orbit information from the GPS satellites G1 to G24 through the detection signal S1 and, based upon the decoded information, selects one or more GPS satellites among the GPS satellites G1 to G24 which have an elevation angle greater than a predetermined elevation angle. Then it judges that the object A is present if the radio waves EW1 to EW24 transmitted from the selected GPS satellites G1 to G24 are blocked. This makes it possible to detect the object A based upon the radio waves from the GPS satellites with a large elevation angle, which provide stable reception while disregarding the radio waves from GPS satellites with a small elevation angle, which would provide unstable reception. Thus, the reliability of object detection is improved.

Figure 3:
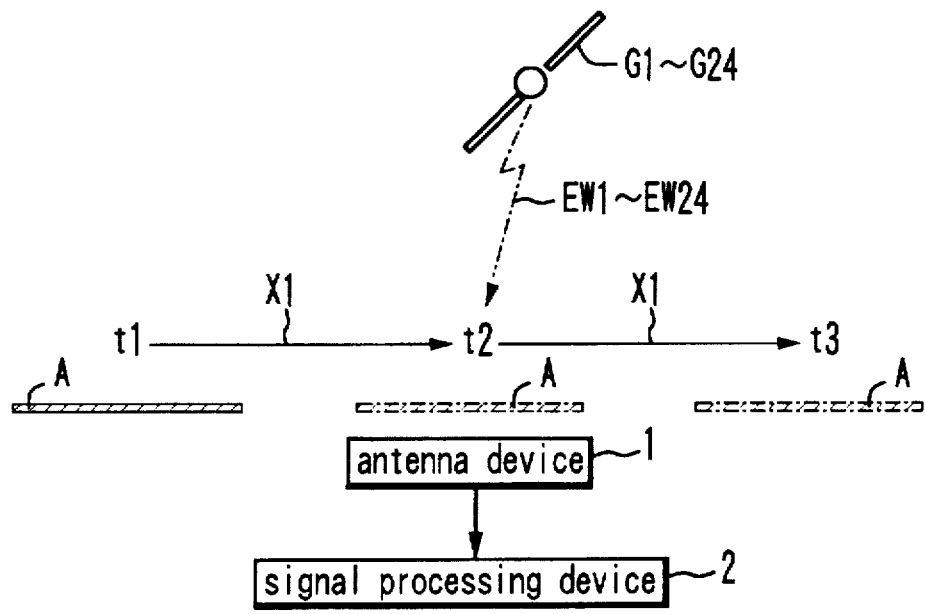
FIG. 3 shows another embodiment of the object detection apparatus according to the present invention.

FIG. 3 shows another embodiment of the object detection apparatus according to the present invention. This embodiment constitutes an object detection apparatus that is suited for detecting the movement of an object A. At a point in time t1, the object A is outside the detection range and the radio waves EW1 to EW24 transmitted from the GPS satellites G1 to G24 are being received by the antenna device 1. Then, the object A moves in the direction indicated with the arrow X1 and at a point in time t2, the radio waves EW1 to EW24 transmitted from the GPS satellites G1 to G24 are blocked by the object A. The object A further moves in the direction indicated with the arrow X1 and exits the detection range.

Figure 4:
FIG. 4 shows the relationship between the time—related positions of an object and the reception levels at the antenna device in the object detection apparatus shown in FIG. 3.

FIG. 4 shows the relationship between the position of the object A at a point in time t and the corresponding reception level of the antenna device 1. As FIG. 4 clearly indicates, the reception level is at high H at the time point t1, indicating that the object A is not present. As the object A moves in the direction indicated with the arrow X1, the object A starts to block the radio waves EW1 to EW24 transmitted by the GPS satellites G1 to G24 at a point in time t11. With this, the reception level at the antenna device 1 starts to go down and, at the time point t2, is at low L.

The object A further moves in the direction indicated with the arrow X1 and at a time point t21, the antenna device starts to receive the radio waves EW1 to EW24 transmitted by the GPS satellites G1 to G24, which, in turn, causes the reception level to begin to rise. Then, at a time point t22, the reception level reaches high H, which indicates that the object A is not present.

As a result, it is possible to detect that the object A has passed beyond the antenna device 1 based upon the change in the reception level shown in FIG. 4. In other words, the movement of the object A can be detected.

Moreover, as mentioned earlier, the GPS satellites are internally provided with an extremely accurate atomic clock and they transmit accurate time signals to the earth based upon the atomic clocks. The antenna device 1 and the signal processing device 2 transmit these time signals as well. Consequently, in the embodiment shown in FIG. 3, movement time information as well as information on the movement of the object A can be obtained. The time information may be prepared at the signal processing device 2.

Furthermore, as shown in FIG. 4, since the time point t11, at which the object A enters the detection area and the time point t22, at which the object A exits the detection area can be ascertained, it is possible to determine the length of time over which the object A is present within the detection area. As a result, the embodiment illustrated in FIG. 3 can be employed in parking time management at a parking lot. In addition, the number of times that the object A has been present in the detection area per unit time can be determined, based upon the number of times the detection signal S1 has been supplied within a specific period of time.

Figure 5:
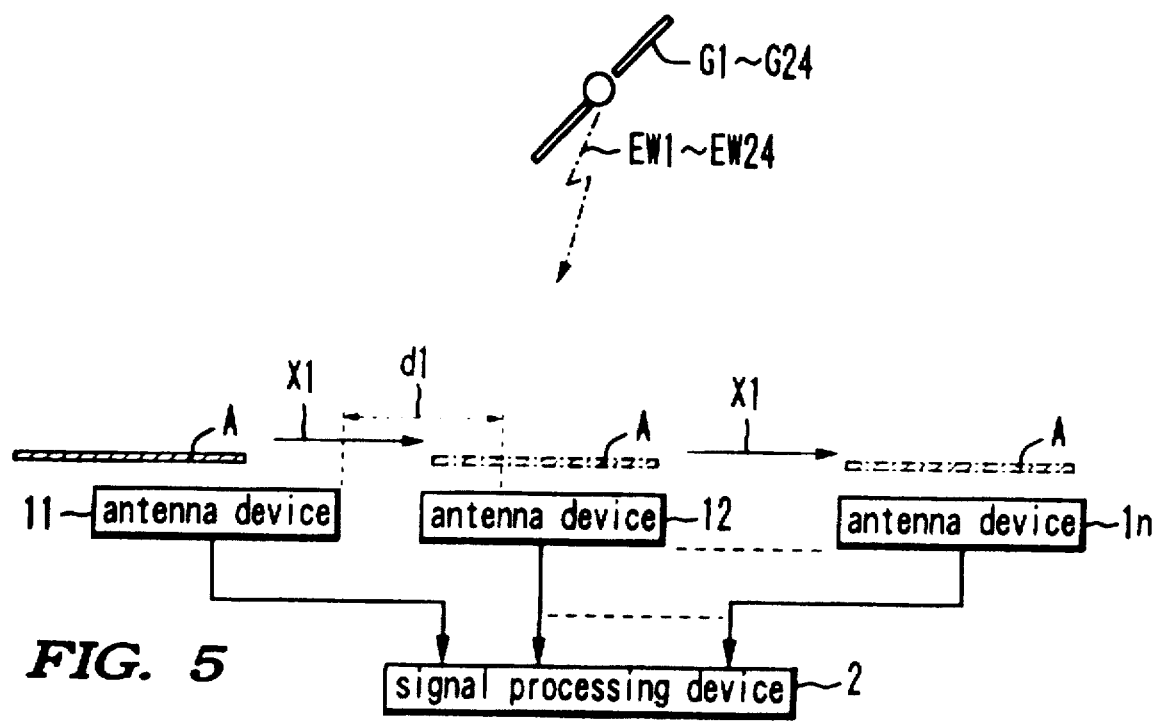
FIG. 5 shows yet another embodiment of the object detection apparatus according to the present invention.

FIG. 5 shows yet another embodiment of the object detection apparatus according to the present invention. This embodiment constitutes an object detection apparatus that is suited for detecting the direction of movement of the object A, the speed of the movement and the time of the movement. A plurality of antenna devices 11 to 1n are provided over intervals d1 along the direction X1, in which the object A may move. Signals output by the antenna devices 11 to 1n are provided to the signal processing device 2. Based upon the signals provided by the individual antenna devices 11 to 1n, the signal processing device 2 detects the direction of movement of the object A, the speed of the movement and the time at which the movement is made.

Figure 6A:
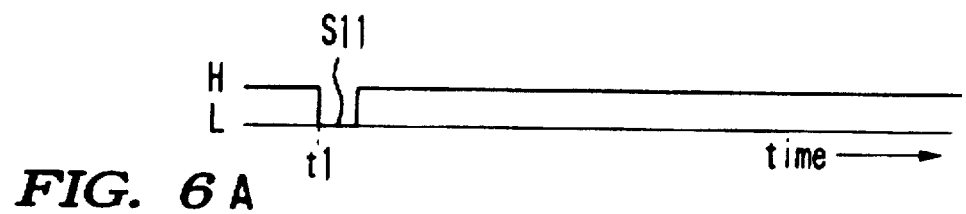
FIG. 6 is a time chart illustrating the operation of the object detection apparatus shown in FIG. 5.
Figure 6B:
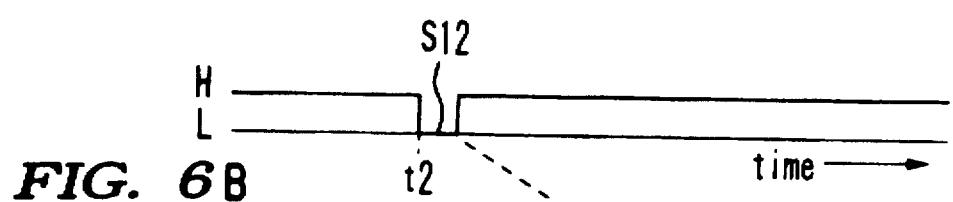
Figure 6C:
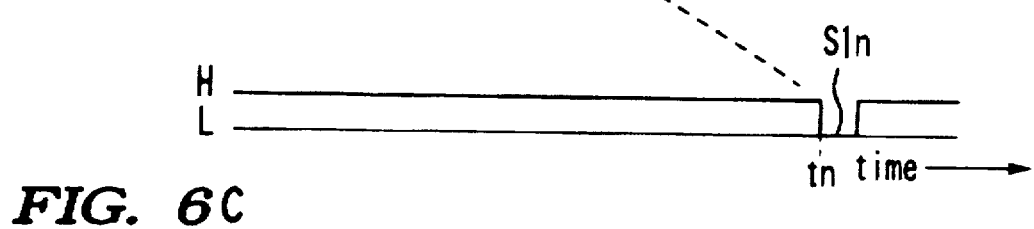

FIG. 6 is a time chart that illustrates the operation of the object detection apparatus shown in FIG. 5. When the object A, moving in the direction indicated with the arrow X1, reaches a location above the antenna device 11 at the time point t1, the antenna device 11 provides a detection signal S11 at low level L which indicates blocking, to the signal processing device 2 (see FIG. 6 (a)). As the object A further moves in the direction indicated with the arrow X1 and reaches the point above the antenna device 12 at the time point t2, the antenna device 12 provides a detection signal S12 at low level L, which indicates blocking to the signal processing device 2.

Based upon the detection signals S11 and S12 provided by the antenna devices 11 and 12, the signal processing device 2 judges that the object A has moved in the direction from the antenna device 11 toward the antenna device 12.

If the distance between the antenna device 11 and the antenna device 12 is known, the speed of movement of the object A can be calculated based upon the length of time required by the object A to travel the distance d1 (time point t2—time point t1). In addition, the movement time information can also be obtained from the time points t1 and t2. The calculation of the direction of movement, the speed of movement and the movement time is executed in correspondence to the number of antenna devices 11 to 1n.

Figure 7:
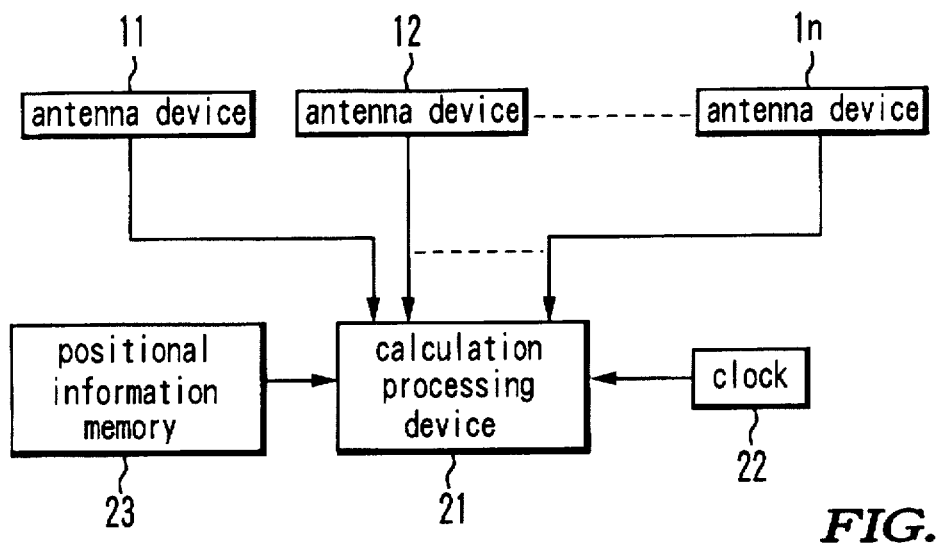
FIG. 7 is a block diagram showing a more specific structure of the object detection apparatus shown in FIGS. 5 and 6.
Figure 8:
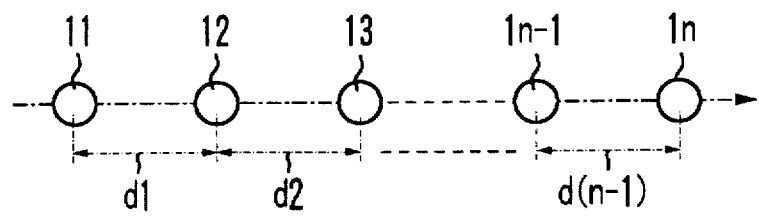
FIG. 8 shows a positioning mode employed for positioning the antenna devices in the object detection apparatus according to the present invention.

FIG. 7 is a block diagram illustrating a more specific structure of the object detection apparatus shown in FIGS. 5 and 6. The signal processing device 2 includes a calculation processing device 21, a clock 22 and a positional information memory 23 which stores positional information for the antenna devices 11 to 1n. By referencing the time point information taken in from the clock 22, the calculation processing device 21 calculates the speed of the movement and the movement time. In addition, by referencing the positional information taken in from the positional information memory 23, it calculates the direction of movement of the object A.

The antenna devices 11 to 1n may be positioned employing various modes of positioning. Examples are shown in FIGS. 8 to 11. First, in the embodiment shown in FIG. 8, the antenna devices 11 to 1n are positioned linearly. The intervals d1 to d (n−1) with which the antenna devices 11 to 1n are positioned may be equal to one another or they may vary. In the case of this embodiment, the length of the object as well as the direction of its movement, its speed of movement and its movement time, explained above can be detected.

Figure 9:
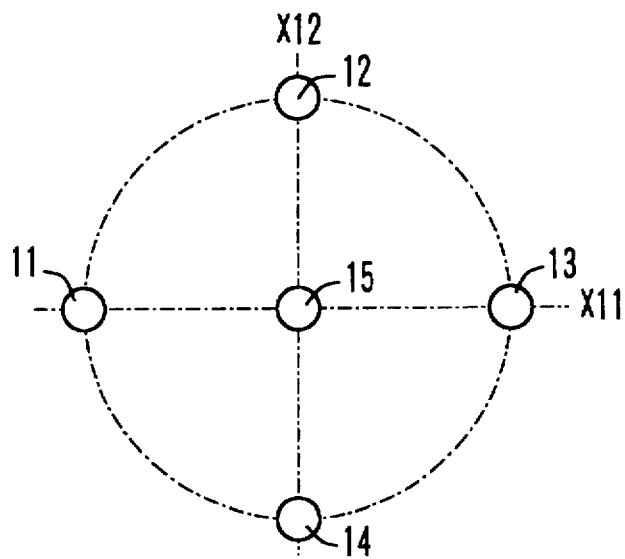
FIG. 9 shows another positioning mode employed for positioning the antenna devices in the object detection apparatus according to the present invention.

The embodiment shown in FIG. 9 includes 5 antenna devices 11 to 15. While the antenna devices 11 to 14 are positioned on approximately the same circumference, the antenna device 15 is provided at the central portion of the configuration of antenna devices 11 to 14. With this object detection apparatus, the direction of movement, the speed and the movement time on a line X11, which is drawn by passing through the antenna devices 11, 15 and 13 and on a line X12 drawn through the antenna devices 12, 15 and 14 can be detected. This means that in the case of the embodiment in FIG. 9, detection of movement of an object in four directions is achieved.

Figure 10:
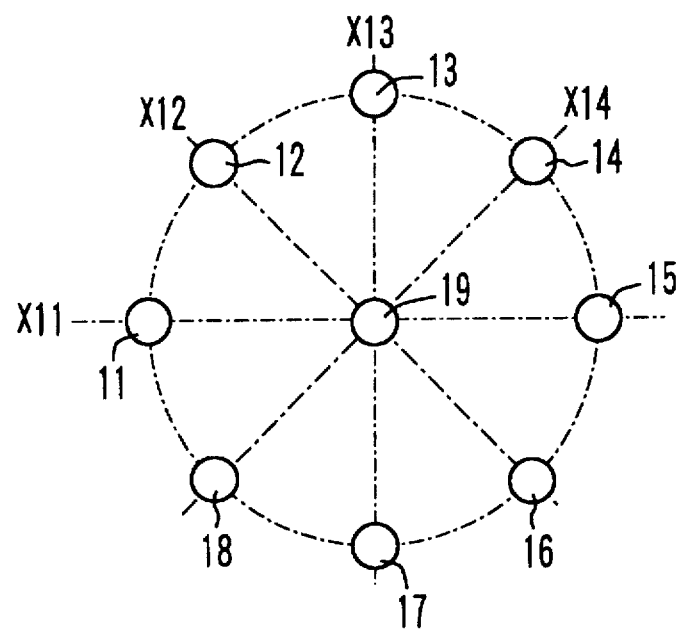
FIG. 10 shows yet another positioning mode employed for positioning the antenna devices in the object detection apparatus according to the present invention.

The embodiment shown in FIG. 10 achieves an improvement in discrimination in object movement detection. In the embodiment, 9 antenna devices 11 to 19 are provided. While the antenna devices 11 to 18 are positioned on approximately the same circumference, the antenna device 19 is provided at the central area of the configuration of antenna devices 11 to 18. With this object detection apparatus, the direction of movement of the object, the speed of the movement and the movement time on a line X11 drawn through antenna devices 11, 19 and 15, on a line X12 drawn through the antenna devices 12, 19 and 16 on a line X13 drawn through the antenna devices 13, 19 and 17 and a line X14 drawn through the antenna devices 14, 19 and 18 can be detected. As a result, in the case of the embodiment shown in FIG. 10, detection of movement of an object in eight directions can be achieved. By increasing the number of antenna devices, movement detection with higher discrimination can be achieved.

Figure 11:
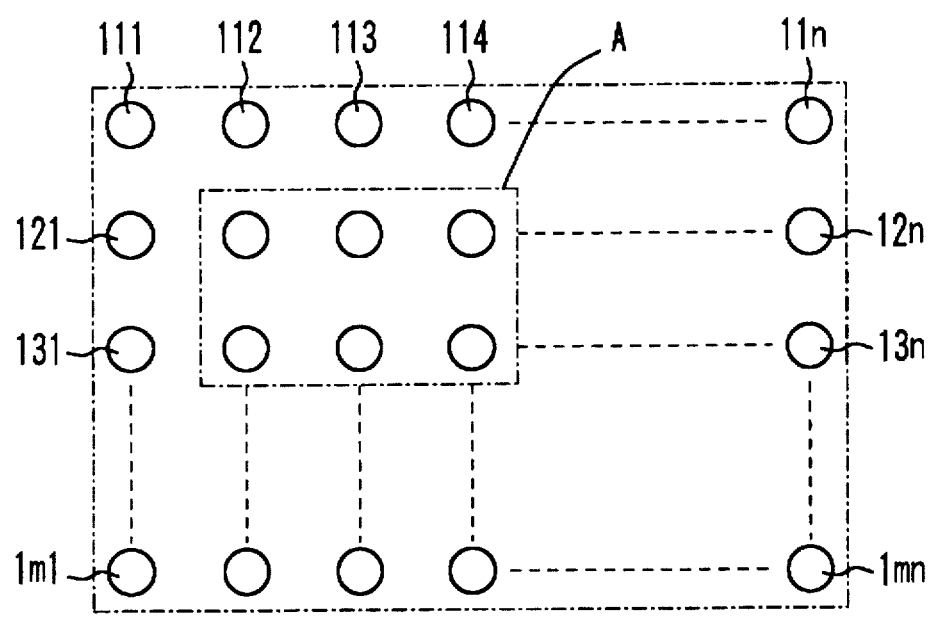
FIG. 11 shows yet another positioning mode employed for positioning the antenna devices in the object detection apparatus according to the present invention.

FIG. 11 shows yet another embodiment of the object detection apparatus according to the present invention. In this embodiment, antenna devices 111 to 1 mn the quantity of which is at n·m are positioned in a lattice pattern over m columns and n rows. When the object A enters within the detection area over which the antenna devices 111 to 1 mn are provided, the reception at some antenna devices is blocked while reception at other antenna devices is not blocked, depending upon the shape (length and width) of the object A. Thus, the shape of the object A can be detected. The quantity of the antenna devices 111 to 1 mn, the intervals with which they are positioned, the relative positional relationship and the like can be selected in correspondence to the shape of the object A to be detected.

Figure 12:
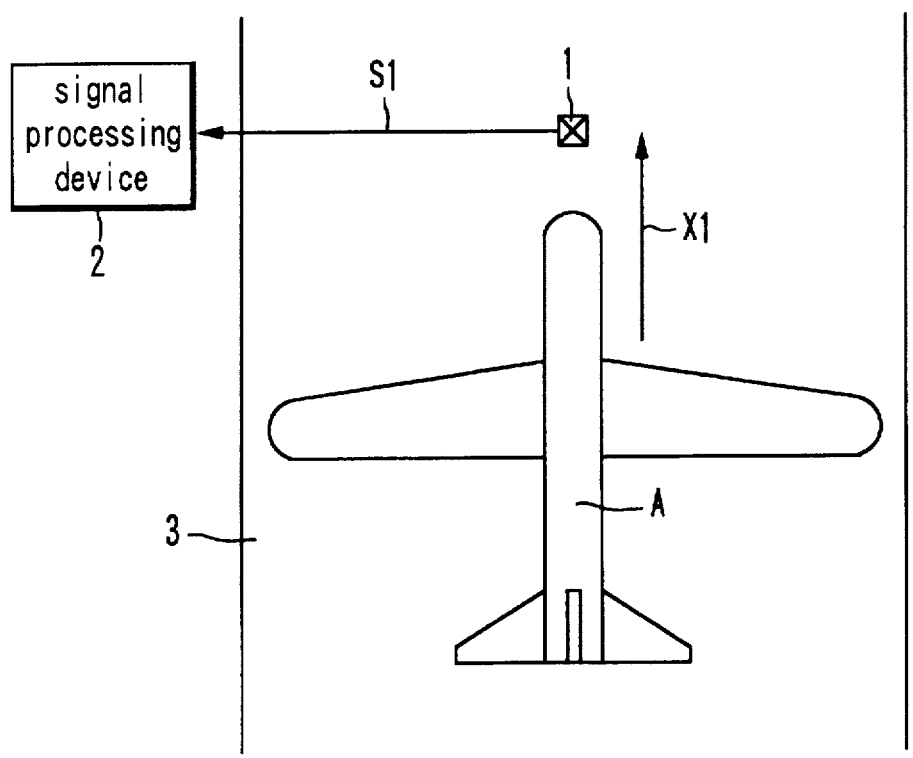
FIG. 12 illustrates an example in which the object detection apparatus according to the present invention is employed for detection of aircraft.
Figure 13:
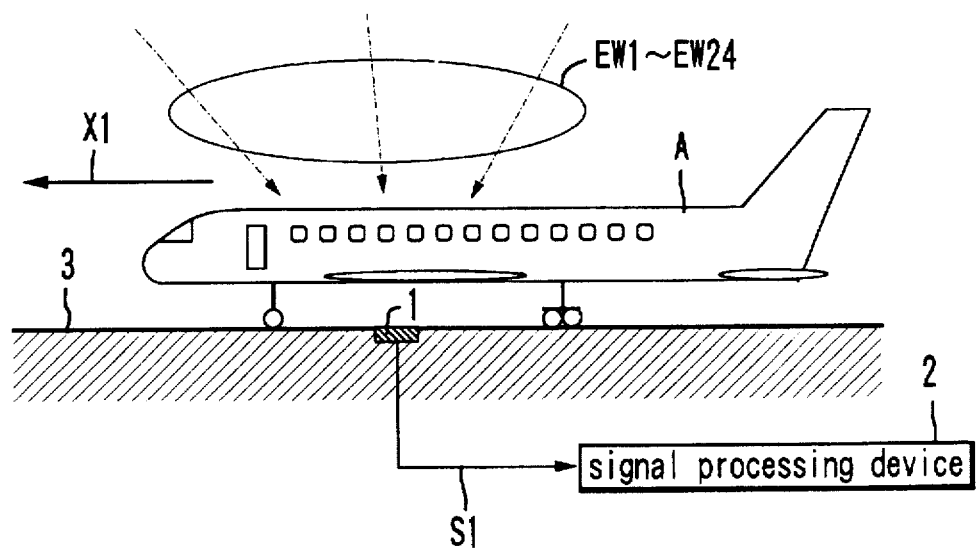
FIG. 13 is a side view of FIG. 1.

Next, a specific example in which the object detection apparatus according to the present invention is adopted in aircraft detection is explained. First, in reference to FIGS. 12 and 13, the object detection apparatus for aircraft detection according to the present invention includes at least one antenna device for detection 1 and a signal processing device 2. The antenna device for detection 1 which is employed as a detecting antenna device, is provided in an area 3, where the aircraft A, which is a moving body, travels or in the vicinity thereof. The antenna device for detection 1 has a function of receiving the radio waves EW1 to EW24 transmitted by the GPS satellites, and when the reception of the radio waves EW1 to EW24 transmitted by the GPS satellites is blocked by the presence of the aircraft A, it outputs a detection signal S11. Then, the signal processing device 2 judges that the aircraft A is present based upon the detection signal S11 provided by the antenna device for detection 1.

The antenna device for detection 1 has a function of receiving radio waves EW1 to EW24 transmitted by the GPS satellites G1 to G24. As explained earlier, since there are three or more GPS satellites G1 to G24 accessible at all times anywhere above the earth, the antenna device for detection 1 can receive one or more radio waves among the radio waves EW1 to EW24 transmitted by the GPS satellites G1 to G24 at all times. The antenna device for detection I may include a reception antenna and a reception circuit.

The antenna device for detection 1 is provided in the area 3 where the aircraft A travels or in the vicinity thereof and when reception of the radio waves EW1 to EW24 transmitted by the GPS satellites G1 to G24 is blocked by the presence of the aircraft A, it outputs the detection signal S11, which contains the blocked signal. The signal processing device 2 determines that the aircraft A is present based upon the detection signal S11 provided by the antenna device for detection 1. Thus, a new object detection apparatus, which may be employed for detecting an aircraft A, which moves on the ground in the advancing direction X1 is achieved.

In the object detection apparatus according to the present invention, the GPS satellites G1 to G24 are used as transmission devices to be employed in combination with the antenna device for detection 1 and, as a result, it is only necessary to install the antenna device for detection 1 for receiving the radio waves EW1 to EW24 transmitted by the GPS satellites G1 to G24 in the area 3 where aircrafts travel or in its vicinity. This makes it possible to achieve an object detection apparatus for aircraft detection that can be easily installed.

The antenna device for detection 1, which receives the radio waves EW1 to EW24 transmitted by the GPS satellites G1 to G24, can be installed in such a manner that only the minimum portion, i.e., the reception antenna, for instance, required for the purpose of reception is exposed at the ground surface with the remaining portion embedded underground. Consequently, the antenna device for detection 1 can be achieved as an underground, embedded type device As has been explained, since the object detection apparatus according to the present invention can be installed easily and, moreover, can be achieved as an underground, embedded type apparatus that does not have a projecting ground surface obstacle, it is suited for aircraft detection which imposes restrictions on the height of the facility above ground. The aircraft detection signal thus obtained may be utilized in the traffic control system disclosed in Japanese Unexamined Patent Publication (KOKAI) No. 131698/1978, the aircraft ground guidance technology disclosed in Japanese Unexamined Patent Publication (KOKAI) No. 21700/1989, the aircraft ground traffic control technology disclosed in Japanese Unexamined Patent Publication (KOKAI) No. 208800/1990, the aircraft detection technology disclosed in Japanese Unexamined Patent Publication (KOKAI) No. 217100/1993 and the like.

In practice, the signal processing device 2 is constituted of a computer system and it is provided at a location distanced from the antenna device for detection 1, i.e., at the traffic control tower, the traffic control center or the like.

In one preferred mode of the present invention, the orbit information transmitted by the GPS satellites G1 to G24 is utilized. The signal processing device 2 decodes the orbit information from the GPS satellites G1 to G24 through the detection signal S11, and then, based upon the decoded information, selects one or more GPS satellites among the GPS satellites G1 to G24 with elevation angles greater than a predetermined elevation angle. Then it determines that the aircraft A is present if the radio waves EW1 to EW24 transmitted by the selected GPS satellites G1 to G24 are blocked. This ensures that the aircraft A is detected based upon radio waves from the GPS satellites with large elevation angles that provide stable reception while disregarding radio waves from GPS satellites with small elevation angles that would provide unstable reception. This, in turn, improves the reliability of aircraft detection.

Figure 14:
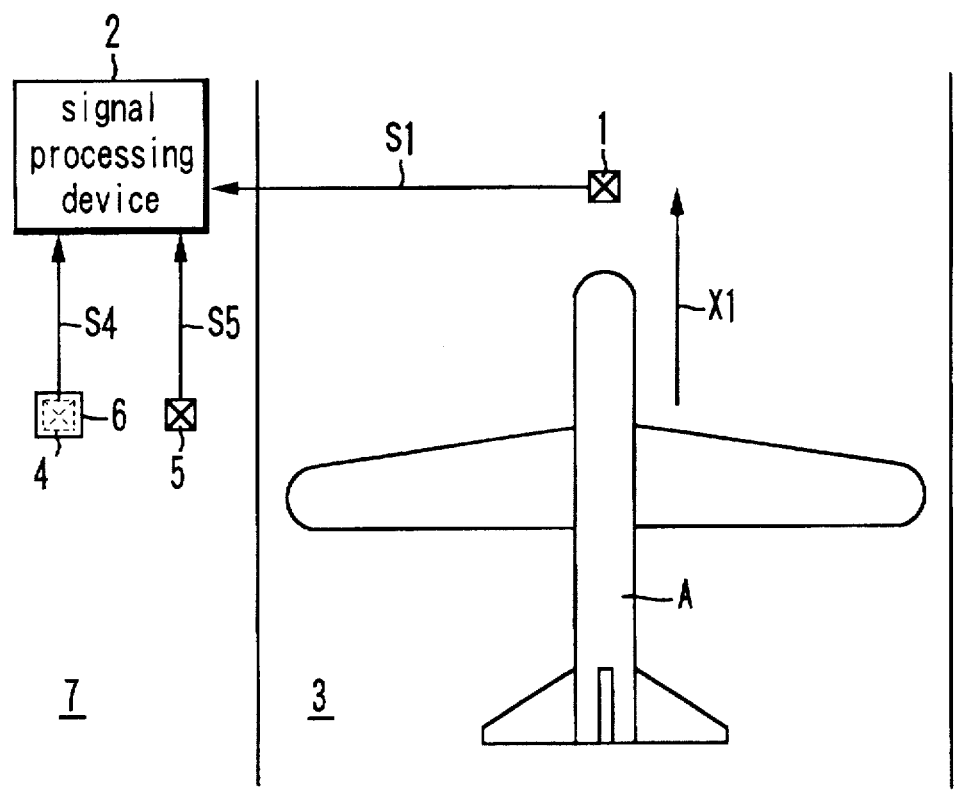
FIG. 14 shows a means for detecting aircraft based upon radio waves from GPS satellites that are positioned at large elevation angles while disregarding radio waves from GPS satellites positioned at small elevation angles.
Figure 15:
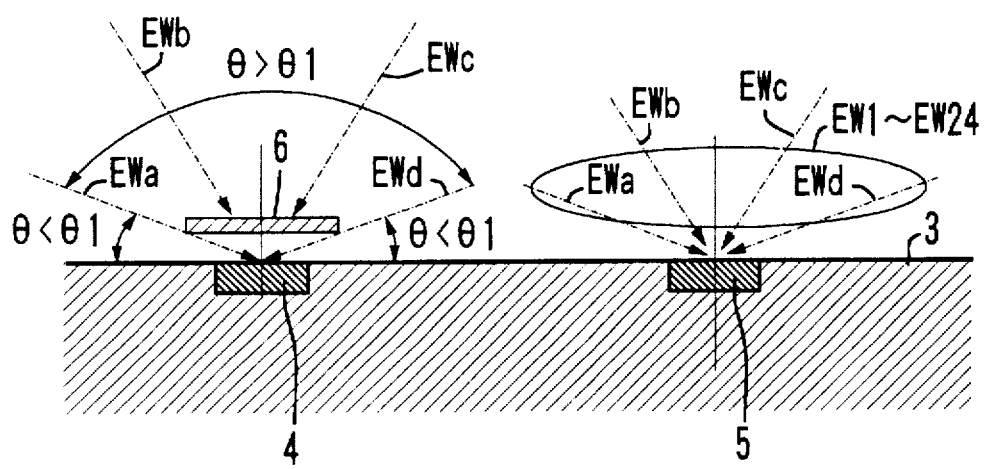
FIG. 15 shows the position and structure of the antenna devices included in the means for detection shown in FIG. 14.

FIGS. 14 and 15 illustrate another means for detecting aircraft A based upon radio waves from the GPS satellites with large elevation angles while disregarding radio waves from GPS satellites with small elevation angles.

In the embodiment shown in FIGS. 14 and 15, a second antenna device 4 and a third antenna device 5 are provided. The second antenna device 4 and the third antenna device 5 are provided in an area 7 which is not affected by the traveling of the aircraft A. The second antenna device 4 is provided with a shield 6 that blocks the radio waves among the radio waves EW1 to EW24 transmitted by the GPS satellites G1 to G24 with elevation angles $\theta$ ($\theta \leq 90°$) that are larger than a predetermined elevation angle $\theta 1$. The third antenna device 5 receives all the radio waves EW1 to EW24 transmitted by the GPS satellites G1 to G24 that are accessible for reception.

The signal processing device 2 identifies the GPS satellites G1 to G24 that are shielded at the second antenna device 4 based upon a detection signal S14 provided by the second antenna device 4 and a detection signal S15 provided by the third antenna device 5, and determines that the aircraft A is present when the detection signal S11 provided by the antenna device for detection 1 does not contain a signal corresponding to a GPS satellite G1 to G24 with a large elevation angle that has been shielded at the second antenna device 4.

For instance, let us assume that radio waves EWa, EWb, EWc and EWd from four satellites among the GPS satellites G1 to G24 are being received by the third antenna device 5, and that the radio waves EWb and EWc with elevation angles $\theta$ larger than the elevation angle $\theta 1$ set by the shield 6, are blocked by the shield 6 while the radio waves EWa and EWd with elevation angles $\theta$ smaller than the elevation angle $\theta 1$ are being received at the second antenna device 4. The signal processing device 2 is capable of determining that the radio waves from the GPS satellites that can be currently received are the radio waves EWa, EWb, EWc and EWd, based upon the detection signal S5 provided by the third antenna device 5. The signal processing device 2 is also capable of identifying the radio waves EWb and EWc as the radio waves with larger elevation angles $\theta$ than the predetermined elevation angle $\theta 1$, based upon the detection signal S4 provided by the second antenna device 4.

The signal S1 from the antenna device for detection 1 is also input to the signal processing device 2. The signal processing device 2 determines that the aircraft A is present when the detection signal S1 provided by the antenna device for detection 1 does not contain the radio waves EWb and EWc with elevation angles $\theta$ ($\theta \leq 90°$), i.e., $\theta > \theta 1$, shielded at the second antenna device 4. This ensures that the aircraft A is detected based upon the radio waves EWb and EWc with large elevation angles which provide stable reception while disregarding the received radio waves EWa and EWd with smaller elevation angles $\theta < \theta 1$ which would provide unstable reception.

Figure 16:
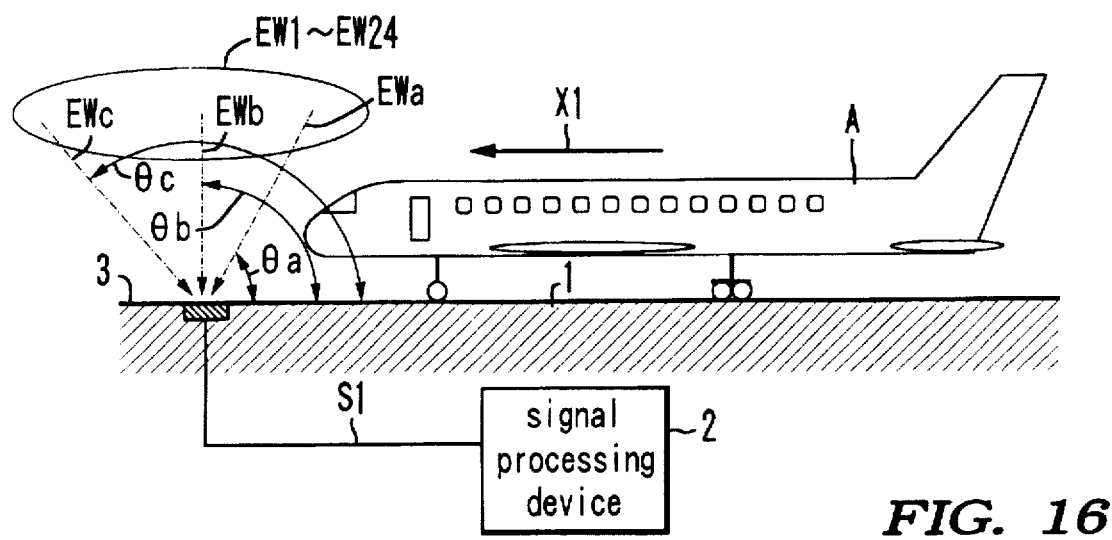
FIG. 16 shows another embodiment of the object detection apparatus according to the present invention.

FIG. 16 shows another embodiment of the object detection apparatus for aircraft detection according to the present invention. In this embodiment, a means for detecting the advancing direction X1 of the aircraft A by taking advantage of the fact that the radio waves EW1 to EW24 transmitted by the GPS satellites G1 to G24 have different elevation angles is disclosed. When the radio waves EWa, EWb and EWc can be received, the elevation angles $\theta$ of the radio waves EWa, EWb and EWc measured along the advancing direction X1 relative to the ground are $\theta a$, $\theta b$ and $\theta c$ respectively and a relationship $\theta a > \theta b > \theta c$ is satisfied, the aircraft A advancing in the direction X1 first blocks the radio wave EWa, then blocks the radio wave EWb and then, lastly, blocks the radio wave EWc. Thus, by determining the order in which the radio waves EWa, EWb and EWc are blocked at the signal processing device 2, the advancing direction X1 of the aircraft A can be detected.

Figure 17:
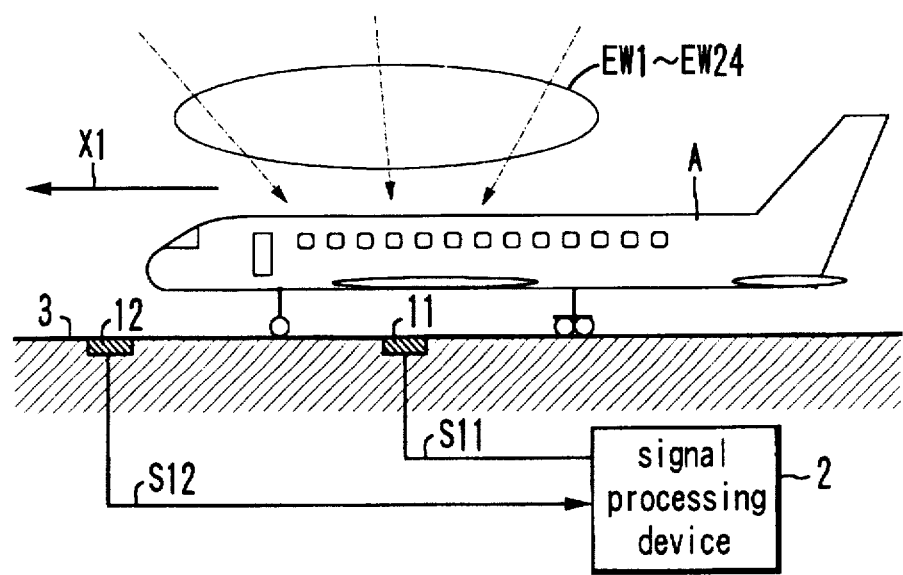
FIG. 17 shows yet another embodiment of the object detection apparatus according to the present invention.

FIG. 17 shows yet another embodiment of the object detection apparatus for aircraft detection according to the present invention. In this embodiment, a plurality of antenna devices for detection 11 and 12 are provided along the advancing direction X1 of the aircraft A. When the aircraft A is advancing in the direction X1, the radio waves EW1 to EW24 being received by the antenna device for detection 11 are first blocked and then the radio waves EW1 to EW24 being received by the antenna device for detection 12 are blocked. As a result, the advancing direction X1 of the aircraft A can be detected based upon the order in which blocking occurs at the antenna devices for detection 11 and 12.

Figure 18:
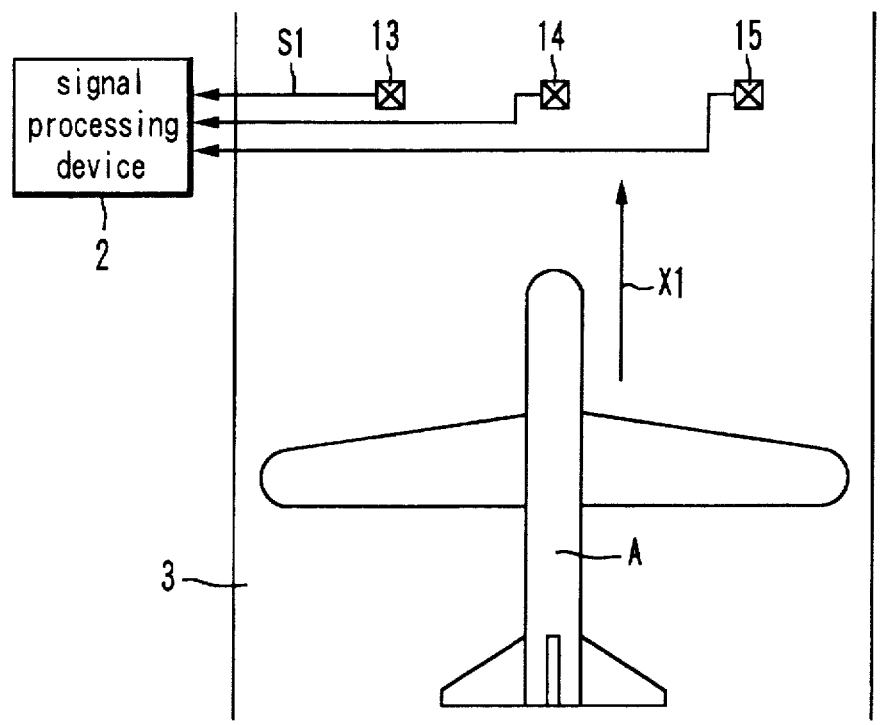
FIG. 18 shows yet another embodiment of the object detection apparatus according to the present invention.

FIG. 18 shows yet another embodiment of the object detection apparatus for aircraft detection according to the present invention. In this embodiment, a plurality of antenna devices for detection 13, 14 and 15 are positioned in a direction crossing the taxiway 3. In this structure, it is possible to detect the aircraft A while ensuring that it is distinguished from other moving bodies such as automobiles based upon the order in which blocking occurs at the antenna devices for detection 13 to 15 or with blocking occurring simultaneously at the antenna devices for detection 13 to 15 caused by the wings of an aircraft.

Figure 19:
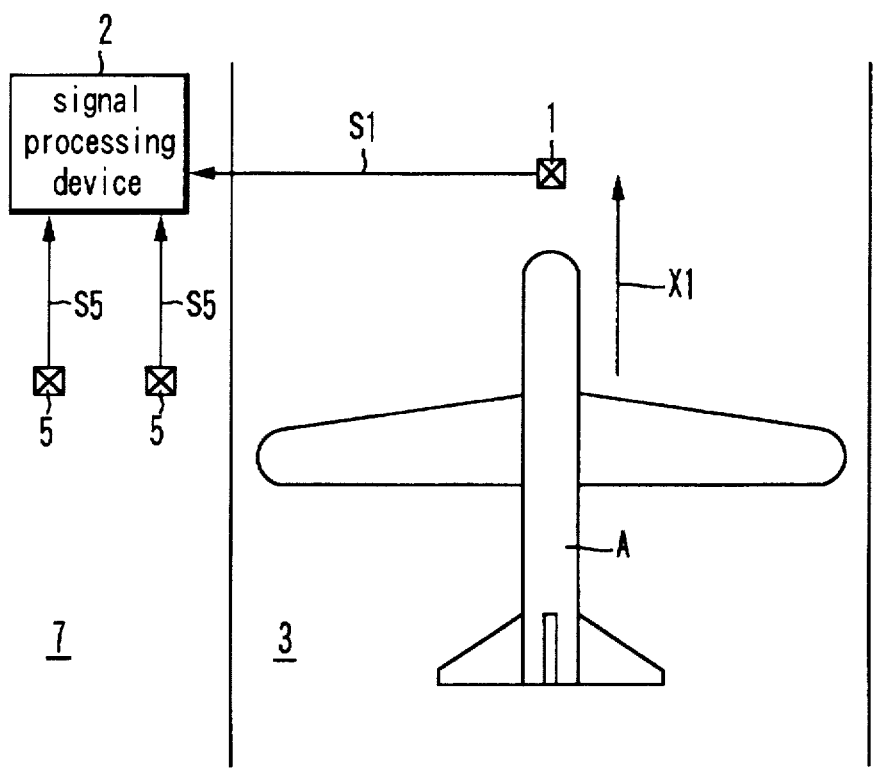
FIG. 19 shows yet another embodiment of the object detection apparatus according to the present invention.

FIG. 19 shows yet another embodiment of the object detection apparatus for aircraft detection according to the present invention. In this embodiment, one or a plurality of antenna devices for detection 1 are provided within the taxiway 3 and one or a plurality of antenna devices for reference 5 are provided in an area 7 outside of the taxiway 3.

By referencing the reception levels at the antenna device for detection 1 and the antenna devices for reference 5, the signal processing device 2 determines that an aircraft A has been detected. In this process, the following detection algorithms, for instance, may be employed.

In one detection algorithm, the levels of reception of the radio waves received from all the GPS satellites selected at the antenna device for detection 1 are added to determine a total reception level SA. Likewise, the levels of reception of the radio waves received from all the GPS satellites selected at the antenna device for reference 5 are added together to determine a total reception level SB.

Next, $20 \log (SA/SB)$ is calculated to determine the relative level difference between the total reception level SA and the total reception level SB. If the relative level difference thus calculated is larger than the detection reference value, it is determined that the aircraft A has been detected.

In another detection algorithm, with the level of reception of the radio wave of a specific GPS satellite selected at the antenna device for detection 1 designated SC and the level of reception of the radio wave received from a specific GPS satellite selected at the antenna devices for reference 5 designated SD, 20log (SC/SD) is calculated to determine the relative level difference between the reception level SC and the reception level SD. If the relative level difference determined in this manner is larger than the detection reference value, it is determined that the aircraft A has been detected. It may be ultimately determined that the aircraft A has been detected by making an integrated judgment based upon the results of detection for the individual GPS satellites. As a means for integrated judgment, a fuzzy logic method or a neural network method may be employed. The detection reference value may be set separately for the individual GPS satellites.

Figure 20:
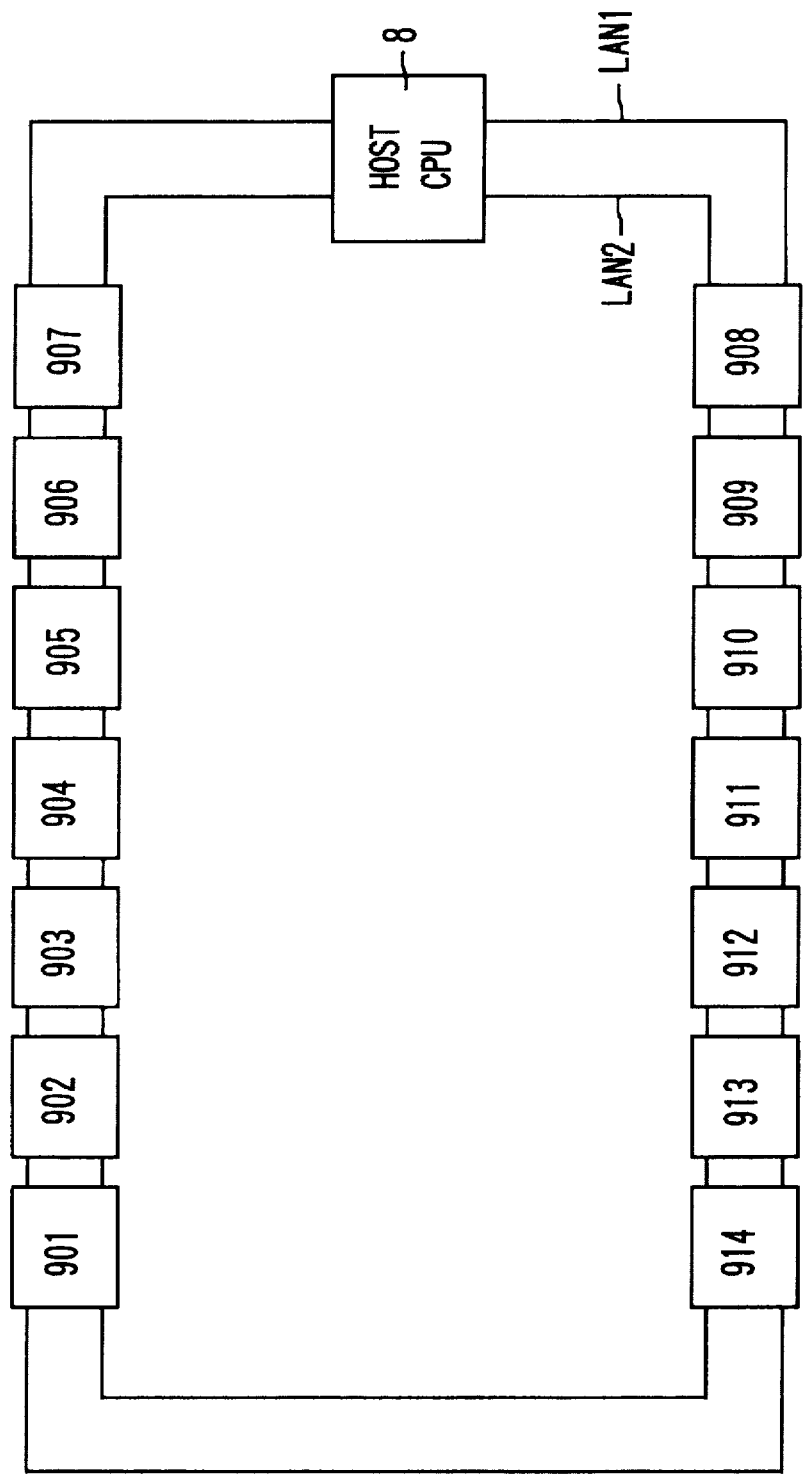
FIG. 20 is a block diagram of the object detection apparatus according to the present invention.

FIG. 20 is a block diagram showing the overall structure of the object detection apparatus for aircraft detection according to the present invention. The embodiment features a structure in which a plurality of antenna devices 901 to 914 are provided and those antenna devices 901 to 914 are connected to a host computer 8 via local area network lines (LAN lines) LAN1 and LAN2. The antenna devices 901 to 914 may be employed either for detection or for reference. By utilizing the LAN lines as described above, if one or more antenna devices among the antenna devices 901 to 914 should fail, another functioning antenna device can be used instead of the failed antenna device.

The so-called token-ring system featuring the two LAN lines, LAN 1 and LAN 2 is adopted in order to correspond to data that are generated with specific intervals, reduce data traffic on the lines, gather the data at the host computer 8 through the functioning LAN line if one of the lines has a failure such as a disconnection, and the like.

In the object detection apparatus for aircraft detection shown in FIG. 20, the host computer 8 provides each of the antenna devices 901 to 914 with the information that each device needs through the LAN line LAN 1 or LAN 2.

This information is stored in RAM (random access memory) provided in the antenna devices 901 to 914. The information described above includes information that indicates whether the device is an antenna device for reference or an antenna device for detection and information that indicates whether or not an antenna device for reference is to be used if the device itself is an antenna device for detection.

If the device itself is an antenna device for detection, information such as the ID number of the antenna device for reference that is to be used for comparison against itself, requirements for the GPS satellites that are to be employed for detection, the algorithm number of the algorithm to be used and the like, are included in that information. The requirements for the GPS satellites include, for instance, the elevation angle, the azimuth angle, the GPS satellite number, the reception level and the like.

If an antenna device for reference is not to be used, the information includes information such as the elevation, the azimuth angle, the GPS satellite number of the satellite to be used for detection, the reception level and the like, as well as information such as the algorithm number of the algorithm to be used.

During operation, when the initial settings for the individual antenna devices 901 to 914 are completed by the host computer 8, antenna devices that have been specified as antenna devices for reference among the antenna devices 901 to 914 transmit information such as the elevation angle, the azimuth angle and the GPS satellite numbers of the GPS satellites from which radio waves are to be received, the reception levels and the like as well as the ID numbers allocated to them, to the LAN line LAN 1 or LAN 2.

The antenna devices that have been specified as antenna devices for detection among the antenna devices 901 to 914 take in the information from the corresponding antenna devices for reference to be used for reference from the data that are running to the LAN line LAN 1 or LAN 2. From the data thus taken in, they take out only the information that match the requirements for the GPS satellites to be used for detection (information such as the elevation angle, the azimuth angle, the GPS satellite number, the reception level and the like) and execute the detection algorithms specified by the same GPS satellites. The results of the execution of the algorithms are sent to the LAN line LAN 1 or LAN 2 after being coupled with their own ID numbers and the times of detection. The detection data X obtained through the detection algorithms may be expressed as multi-value detection levels instead of logical values (0, 1). The data obtained through the execution of the algorithms are taken into the host computer 8 along with the ID numbers of the antenna devices for detection which are the sources of data generation through the LAN line LAN 1 or LAN 2.

The host computer 8 makes a decision as to which antenna device for detection is detecting a moving body based upon the data it has received. In addition, the host computer 8 takes in the data that has been put out by the antenna devices for reference and performs monitoring at all times as to whether or not the antenna devices for reference are operating normally based upon the detected levels and the data. If the host computer 8 decides that an error has occurred at an antenna device for reference, it issues a command that the antenna device for detection using that antenna device for reference should now switch to another functioning antenna device for reference. Since the positions of the GPS satellites change over time, changes corrections must be made in antenna devices for detection as necessary. With this, stable detection is achieved.

If no antenna devices for reference are used, data from the antenna devices for detection are sent to the LAN line LAN 1 or LAN 2 based upon the specified algorithm.

Figure 21:
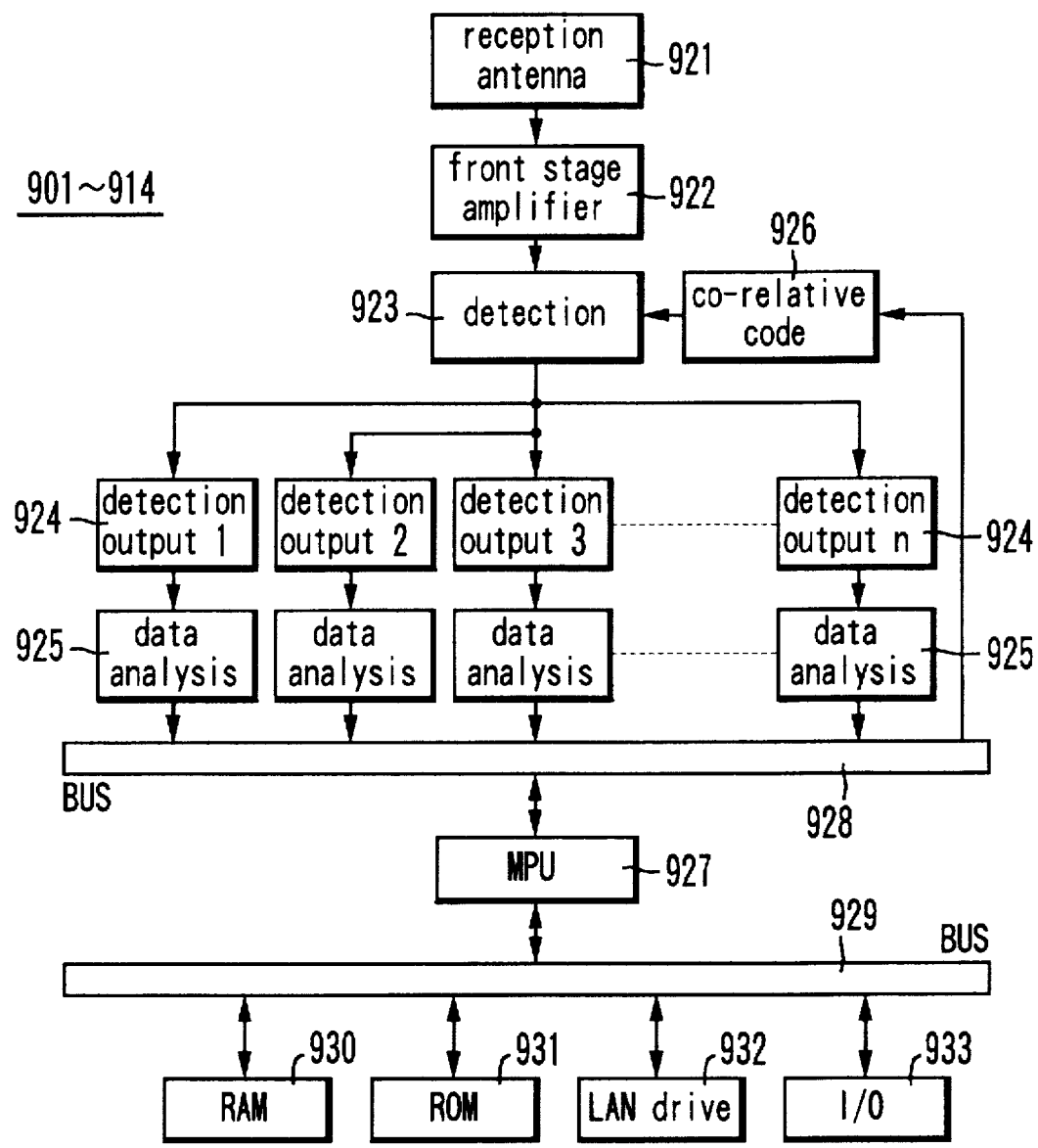
FIG. 21 is a block diagram of an antenna device employed in the object detection apparatus shown in FIG. 20.

FIG. 21 is a block diagram that shows the structure of the antenna devices 901 to 914. The antenna devices 901 to 914 are each provided with a reception antenna 921, a front stage amplifier 922, a detection circuit 923, detection output units 924, data analysis units 925, a co-relative code generating unit 926, a calculation processing unit 927, buses 928 and 929, a random access memory (RAM) 930, a read only memory (ROM) 931, a LAN drive unit 932 and an input/output (I/O) unit 933 and the like.

The reception antenna 921 receives radio waves from the GPS satellites. The front stage amplifier 922 amplifies the radio waves received by the reception antenna 921 at a low noise level. The detection circuit 923 performs SS communication detection. The number of detection output units 924 provided is n, to correspond to the number of GPS satellites from which waves are to be received. The detection output units 924 detect and output radio waves received from the individual GPS satellites. The co-relative code generating unit 926 generates co-relative codes for the purpose of performing SS detection. The calculation processing unit 927 performs overall management and control for the antenna devices 901 to 914, including taking in the data output by the data analysis units 925 via the bus 928 and calculating the moving body detection results in conformance to the specified algorithm.

Information such as the initial information is written in the RAM 930. Required programs and the like are written in the ROM 931 in advance. The LAN drive unit 932 performs management related to driving the LAN. The input/output (I/O) unit 933 constitutes an interface with external auxiliary units.

Figure 22:
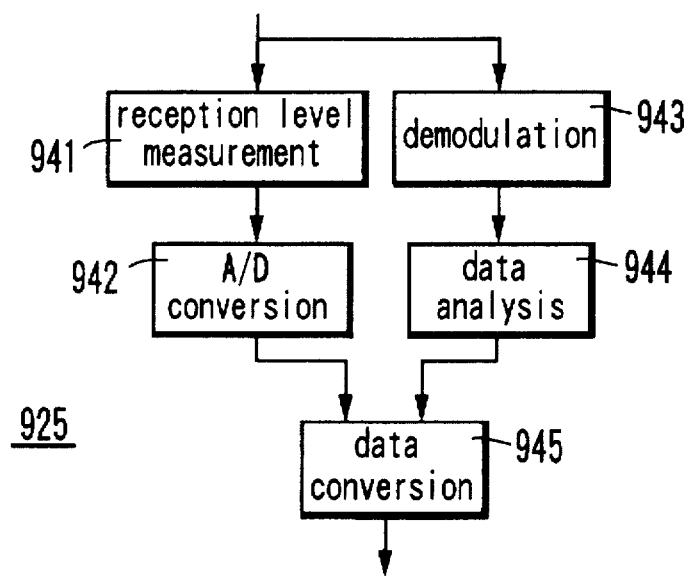
FIG. 22 is a block diagram showing the structure of the data analysis unit of the antenna device shown in FIG. 21.

The number of data analysis units 925 provided is n, to correspond to the number of detection output units 924. The data analysis units 925 analyze the radio waves received from the GPS satellites. FIG. 22 presents a detailed block diagram of each data analysis unit 925. The data analysis units 925 are each provided with a reception level measuring portion 941, an A/D conversion portion 942, a demodulator portion 943, a data analyzing portion 944 and a data conversion portion 945.

The reception level measuring portion 941 measures the level of reception of the signals provided by the detection output unit 924. The A/D conversion portion 942 performs A/D conversion for the signal provided by the reception level measuring portion 941 and outputs it.

The demodulator portion 943 demodulates the signal provided by the detection output unit 924 and takes out data. The data analyzing portion 944 calculates and determines the position of the antenna device to which it belongs based upon the data supplied by the demodulator portion 943.

The data conversion portion 945 couples the reception level signal provided by the A/D conversion portion 942 and the data of the GPS satellites supplied by the data analyzing portion 944, prepares a signal that can be processed at the calculation processing unit 927 and then outputs it.

Figure 23:
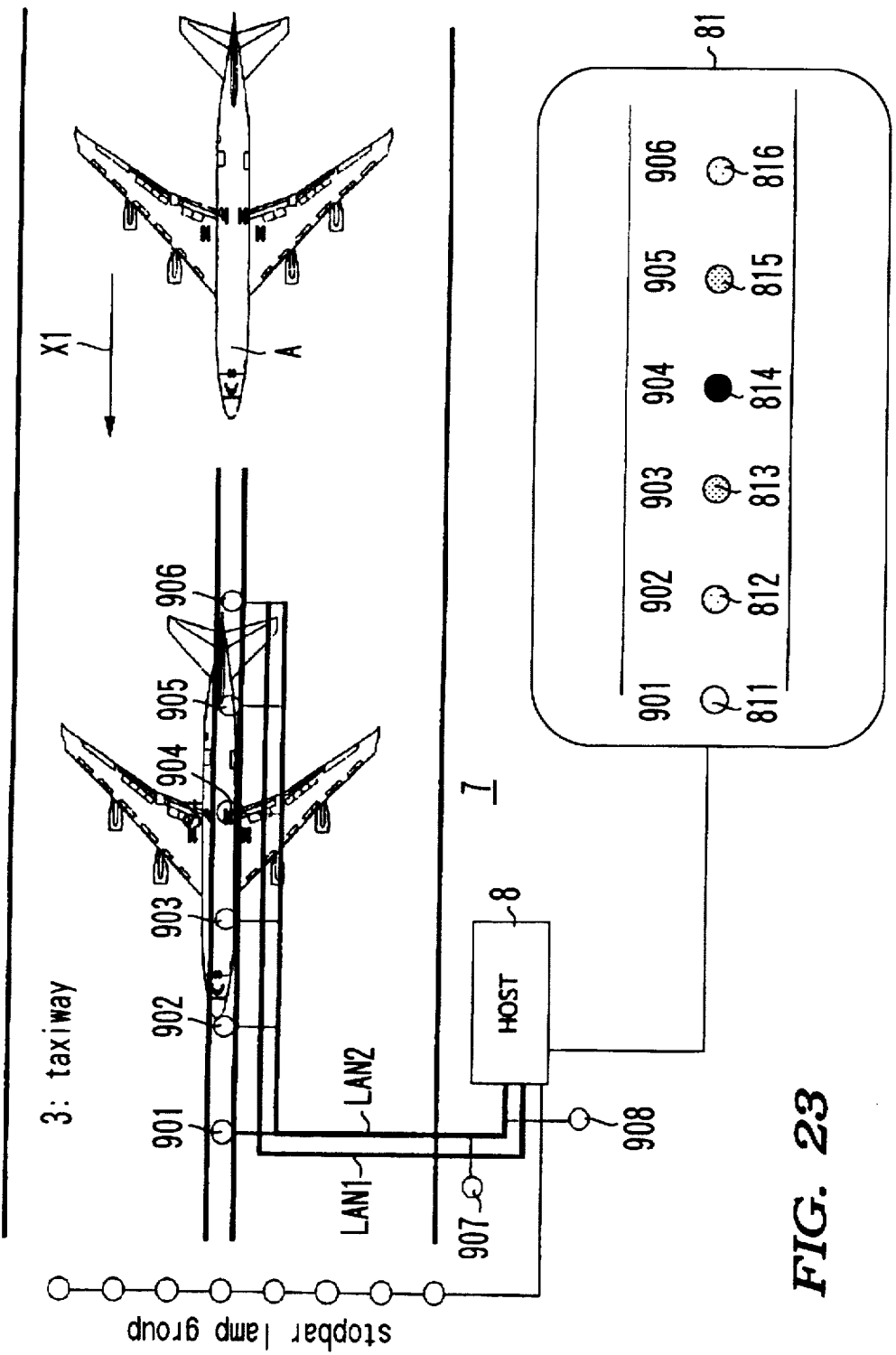
FIG. 23 illustrates a structural example of an aircraft detection system that employs the object detection apparatus according to the present invention.

FIG. 23 shows a structural example of an aircraft detection system that employs the object detection apparatus according to the present invention. In the figure, the antenna devices 901 to 906 are employed as antenna devices for detecting the aircraft A, whereas the antenna devices 907 and 908 are employed as antenna devices for reference. The antenna devices for detection 901 to 906 are positioned over intervals along the traveling direction X of the aircraft A at approximately the middle area in the direction of the width of the taxiway 3 through which the aircraft is guided. The antenna devices for reference 907 and 908 are positioned in an area 7 that does not come under the influence of the traveling aircraft A. The quantities of the antenna devices for detection 901 to 906 and the antenna devices for reference 907 and 908 are arbitrary. In addition, of the plurality of antenna devices for reference 907 and 908, one may be employed for reference with the rest being reserved as auxiliary or backup units.

The information on the GPS satellites and other information that may be used for the initial setting should be prepared using values that are predetermined by taking into consideration the environment in which the airport where the antenna devices for detection 901 to 906 are installed is located.

If the aircraft A is not present within the taxiway 3, the reception levels at the antenna devices for detection 901 to 906 and the reception levels at the antenna devices for reference 907 and 908 are almost the same. Thus, there is very little relative reception level difference.

As the aircraft A approaches the antenna devices for detection 901 to 906, the relative reception level difference between the reception level at the antenna devices for detection 901 to 906 and the reception level at the antenna devices for reference 907 and 908 increases. Then, when the aircraft A is positioned immediately on top of one of the antenna devices for detection 901 to 906, the relative reception level difference between the reception level at the antenna device immediately beneath the aircraft A and the reception level at the antenna devices for reference 907 and 908 reaches its maximum. Such a relative reception level difference occurs at the antenna devices in the order of 906→905→904→903→902→901 as the aircraft A advances.

This information is taken into the host computer 8 via the LAN line LAN 1 or LAN 2. The host computer 8 outputs the results of the detection of the aircraft A based upon the results of the calculation that have been input.

An effective method for outputting the results of the detection of aircraft may be achieved by employing a means for visually displaying the position of the aircraft A on a display unit or the like. For instance, indicator lamps 811 to 816 which correspond to the antenna devices 901 to 906 may be provided on a display panel 81 to achieve a display such that, as the aircraft A approaches the antenna devices 901 to 906, the lighted states of the indicator lamps 811 to 816 become brighter, whereas as the aircraft A moves away from the antenna devices for detection 901 to 906, the lighted states of the indicator lamps 811 to 816 become dimmer. This display method achieves a display which makes the aircraft A look as if it were continually moving on the display panel 81. With this, even in a state of poor visibility caused by rain, fog or the like, it is possible to visually ascertain where the aircraft A is currently positioned, at what speed it is moving in which direction by looking at the indication on the display panel 81.

Moreover, by using the information such as the position, the direction of movement, the speed and the like of the aircraft which is obtained from the antenna devices, overall aircraft control can be achieved and, at the same time, it is possible to execute stop bar control as well (see FIG. 23).

While the present invention has been explained using specific examples, it will be apparent to a person skilled in the field to which the invention pertains that a number of variations are possible without departing from the spirit and teaching of the present invention.

INDUSTRIAL APPLICABILITY

The present invention offers the following possibilities for industrial application.

(a) A new object detection apparatus which does not require installation of a means for transmission is provided.

(b) An object detection apparatus capable of detecting the presence/absence of an object, the movement of an object, the direction of movement, the speed of movement, the shape, including length and width of an object, and the quantity of objects and related time information is provided.

(c) An object detection apparatus that can be easily installed is provided.

(d) An object detection apparatus that can be achieved as an underground, embedded type without having projecting ground surface obstacles is provided.

We claim:

1. An object detection apparatus used for detecting a moving object on the ground, comprising at least one antenna device and a signal processing device, wherein:

said at least one antenna device is embedded underground, in such a manner that radio waves transmitted by GPS satellites are received when said moving object is not located above said at least one antenna device, and outputs a signal to said signal processing device when said moving object is located above said at least one antenna device and outputs another signal to said signal processing device when said moving object is not located above said at least one antenna device; and said signal processing device uses said signals to determine whether or not said moving object is located above said at least one antenna device.

2. An object detection apparatus according to claim 1, wherein:

said at least one antenna device comprises a plurality of antenna devices.

3. An object detection apparatus according to claim 2, wherein:

said plurality of antenna devices are positioned in a direction intersecting a direction in which said moving object travels.

4. An object detection apparatus according to claim 2, wherein:

said plurality of antenna devices are positioned along a direction in which said moving object travels.

5. An object detection apparatus according to claim 4, wherein:

said signal processing device is provided with a display unit with said display unit having indicating means corresponding to said plurality of antenna devices, and said indicating means execute display that corresponds to a position of said moving object relative to said plurality of antenna devices.

6. An object detection apparatus according to claim 1, wherein:

said signal processing device decodes orbit information related to said GPS satellites, selects one or more GPS satellites with elevation angles greater than a predetermined elevation angle based upon said information thus decoded and determines that a moving body is present when radio waves transmitted by said GPS satellites that have been selected are blocked.

7. An object detection apparatus according to claim 1, wherein:

said antenna device includes a first antenna device and a second device, said first antenna device is provided in an area where radio waves transmitted by said GPS satellites are blocked; and said second antenna device is provided in an area where radio waves transmitted by said GPS satellites are not blocked.

8. An object detection apparatus according to claim 7, wherein:

said second antenna device is provided with a shield, with said shield blocking radio waves transmitted by GPS satellites with elevation angles equal to or greater than a predetermined elevation angle.

9. An object detection apparatus according to claim 8, wherein:

said antenna device includes a third antenna device which receives radio waves from all GPS satellites that can be received.

10. An object detection apparatus according to claim 9, wherein:

said signal processing device identifies GPS satellites that are blocked at said second antenna device based upon a reception signal provided by said second antenna device and a reception signal provided by said third antenna device and determines that a moving object is present when signals corresponding to GPS satellites with elevation angles that are blocked at said second antenna device are not contained in a reception signal provided by said first antenna device.

11. An object detection apparatus according to claim 7, wherein:

said second antenna device is a reference antenna device.

12. An object detection apparatus according to claim 1, wherein:

said antenna device and said signal processing device are connected through a local area network.

13. An object detection apparatus according to claim 1, wherein:

said moving object is an aircraft.

14. An object detection apparatus according to claim 1, wherein:

said signal processing device uses said signals output from said at least one antenna device to determine a duration that said moving object is located above said at least one antenna device.

15. An object detection apparatus according to claim 1, wherein:

said signal processing device uses said signals output from said at least one antenna device to determine a duration that said moving object is not located above said at least one antenna device.

16. An object detection apparatus according to claim 2, wherein:

said signal processing device uses signals output from said plurality of antenna devices to determine a shape of said moving object.

17. An object detection apparatus according to claim 2, wherein:

said signal processing device uses signals output from said plurality of antenna devices to determine a quantity of moving objects.

* * * * *